United States Patent
Labrie

(10) Patent No.: US 10,511,935 B2
(45) Date of Patent: *Dec. 17, 2019

(54) LOCATION BASED INFORMATION SERVICE APPLICATION

(71) Applicant: Martin Labrie, Montreal (CA)

(72) Inventor: Martin Labrie, Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/009,621

(22) Filed: Jun. 15, 2018

(65) Prior Publication Data

US 2018/0295467 A1    Oct. 11, 2018

Related U.S. Application Data

(63) Continuation of application No. 15/831,947, filed on Dec. 5, 2017, which is a continuation of application No. 15/140,860, filed on Apr. 28, 2016, now Pat. No. 9,866,995.

(60) Provisional application No. 62/155,817, filed on May 1, 2015.

(51) Int. Cl.
  *H04W 4/024* (2018.01)
  *G06F 3/16* (2006.01)

(52) U.S. Cl.
  CPC ............ *H04W 4/024* (2018.02); *G06F 3/165* (2013.01)

(58) Field of Classification Search
  CPC .......... H04W 4/02; H04W 64/00; G06F 3/167
  USPC .... 455/404.2, 412.1–414.2, 418–422.1, 436, 455/444, 552.1, 550.1, 456.1, 456.2, 457, 455/566, 41.1–41.2; 370/328–332, 338
  See application file for complete search history.

(56) References Cited

U.S. PATENT DOCUMENTS

| | | | | |
|---|---|---|---|---|
| 5,949,852 A * | 9/1999 | Duncan | ............... | H04M 1/6505 379/100.02 |
| 6,269,303 B1 * | 7/2001 | Watanabe | .......... | G01C 21/3461 340/988 |
| 6,504,825 B1 * | 1/2003 | Atkins | ..................... | G01S 5/02 340/8.1 |
| 8,503,986 B2 | 8/2013 | Burton, Jr. | | |
| 8,700,067 B2 * | 4/2014 | Shirakawa | ............. | G06Q 10/10 455/414.1 |
| 9,373,112 B1 * | 6/2016 | Henderson | ............. | G06Q 20/40 |
| 9,866,995 B2 * | 1/2018 | Labrie | ................... | H04W 4/024 |
| 2003/0152293 A1 | 8/2003 | Bresler | ............. | G06K 9/00463 382/305 |
| 2005/0190899 A1 * | 9/2005 | Rhodes, Jr. | ............ | H04L 12/66 379/101.01 |
| 2005/0202835 A1 * | 9/2005 | Sato | ................... | G06Q 30/0207 455/456.6 |
| 2005/0239450 A1 * | 10/2005 | Wesby | .................... | H04M 1/05 455/418 |
| 2006/0212220 A1 * | 9/2006 | Bou-Ghannam | .... | G01C 21/005 701/431 |
| 2007/0054675 A1 * | 3/2007 | Duan | .................... | H04W 4/029 455/456.2 |
| 2007/0214041 A1 * | 9/2007 | Patel | .................... | G06Q 30/02 705/14.55 |

(Continued)

*Primary Examiner* — Babar Sarwar
(74) *Attorney, Agent, or Firm* — Stratford Managers Corporation

(57) ABSTRACT

A method and system for providing audio information to a mobile device relating to geographical elements at the geo-location coordinates of a location on a map on a screen on the device. The method and system provide for selecting and sending electronic files to the device relating to different geographical elements at the geo-location coordinates.

18 Claims, 5 Drawing Sheets

(56) References Cited

U.S. PATENT DOCUMENTS

| | | | |
|---|---|---|---|
| 2008/0281687 A1 | 11/2008 | Hurwitz | |
| 2008/0281859 A1* | 11/2008 | Yagi | G06F 17/218 |
| 2009/0006336 A1* | 1/2009 | Forstall | G06F 16/9535 |
| 2009/0192709 A1* | 7/2009 | Yonker | H04W 4/029 |
| | | | 701/470 |
| 2009/0325545 A1* | 12/2009 | Hawkins | G06Q 30/02 |
| | | | 455/414.1 |
| 2010/0009698 A1* | 1/2010 | Yang | H04L 67/025 |
| | | | 455/456.3 |
| 2010/0075695 A1* | 3/2010 | Haughay, Jr. | H04W 4/029 |
| | | | 455/456.1 |
| 2010/0161720 A1* | 6/2010 | Colligan | G06Q 30/02 |
| | | | 709/203 |
| 2011/0209201 A1* | 8/2011 | Chollat | G06F 21/6218 |
| | | | 726/4 |
| 2012/0003956 A1* | 1/2012 | Austin | H04M 1/72538 |
| | | | 455/404.2 |
| 2012/0088523 A1* | 4/2012 | Shirakawa | G06Q 10/10 |
| | | | 455/456.3 |
| 2013/0031575 A1* | 1/2013 | Gallant | H04L 41/5038 |
| | | | 725/20 |
| 2013/0238700 A1* | 9/2013 | Papakipos | G06F 21/81 |
| | | | 709/204 |
| 2013/0295910 A1* | 11/2013 | Enty | H04W 8/22 |
| | | | 455/419 |
| 2014/0038544 A1* | 2/2014 | Jones | G08B 13/196 |
| | | | 455/404.2 |
| 2014/0057649 A1* | 2/2014 | Han | H04W 4/025 |
| | | | 455/456.1 |
| 2015/0058128 A1* | 2/2015 | Chow | H04W 4/021 |
| | | | 705/14.64 |
| 2016/0182942 A1* | 6/2016 | Liang | H04N 21/2223 |
| | | | 725/37 |
| 2016/0192156 A1* | 6/2016 | Freeman | H04W 4/023 |
| | | | 455/456.1 |
| 2016/0323702 A1* | 11/2016 | Labrie | H04W 4/024 |
| 2017/0070463 A1* | 3/2017 | Papakipos | G06F 21/81 |
| 2018/0295467 A1* | 10/2018 | Labrie | H04W 4/024 |

* cited by examiner

LOCATION BASED INFORMATION SERVICE APPLICATION

CROSS-REFERENCE TO RELATED APPLICATION(S)

This application is a continuation of U.S. patent application Ser. No. 15/831,947 filed on May 12, 2017, which is a continuation of U.S. patent application Ser. No. 15/140,860, filed Apr. 28, 2016, now allowed, which claims priority to U.S. Provisional Application No. 62/155,817, filed May 11, 2015, each of which is hereby incorporated by reference herein in its entirety.

FIELD OF THE INVENTION

The present disclosure relates to information services applications and specifically location based information services application.

BRIEF SUMMARY

In accordance with one aspect of the invention, there is provided a method of providing audio information on geographical elements at a geo-location. The method comprises receiving, at a server, geo-location coordinates of a location on a map on a screen of a mobile device upon generation of a stimulus associated with the map; selecting electronic files comprising information on the geographical elements located within a predetermined radius of the geo-location; sending the electronic files to the mobile device; storing the electronic files in a memory on the mobile device; executing the electronic files on the mobile device.

The method may also include receiving the predetermined criterion from the mobile device, the predetermined criterion established by a user of the mobile device.

The stimulus may comprise a click of a button, a touch on the screen, a gesture with the device or a voice command.

The user of the mobile device may determine size, content and language of the electronic files, and the content of the electronic files may be provided by city councils, tourism departments, educational departments or advertising groups, or is crowd-sourced.

In another implementation, the method includes removing the electronic files from the memory of the mobile device, e.g. as by a timer.

In accordance with another aspect of the invention, there is provided a system for providing electronic information on geographical elements at a geo-location of a location on a map on a screen of a mobile device upon generation of a stimulus associated with the map. The system comprises a server having one or more processors, and one or more non-transitory computer-readable media having stored thereon computer-executable instructions that, when executed by the one or more processors, cause the system to receive geo-location coordinates of the location on the map, select electronic files comprising information on the geographical elements located within a predetermined radius of the geo-location, send the electronic files to the mobile device, store the electronic files in a memory on the mobile device, and execute the electronic files on the mobile device.

The removing of electronic files from the memory of the mobile device is determined by a timer.

A further aspect of the invention provides a device comprising an interface for communicating with a non-transitory computer-readable storage medium including a set of instructions that, when executed by at least one processor, cause the at least one processor to perform steps comprising receiving, at a server, geo-location coordinates of a location on a map on a screen of a mobile device upon generation of a stimulus associated with the map; electing electronic files comprising information on the geographical elements located within a predetermined radius of the geo-location; sending the electronic files to the mobile device; storing the electronic files in a memory on the mobile device; and executing the electronic files on the mobile device.

BRIEF DESCRIPTION OF THE DRAWINGS

The foregoing and other advantages of the disclosure will become apparent upon reading the following detailed description and upon reference to the drawings.

Figure 1:
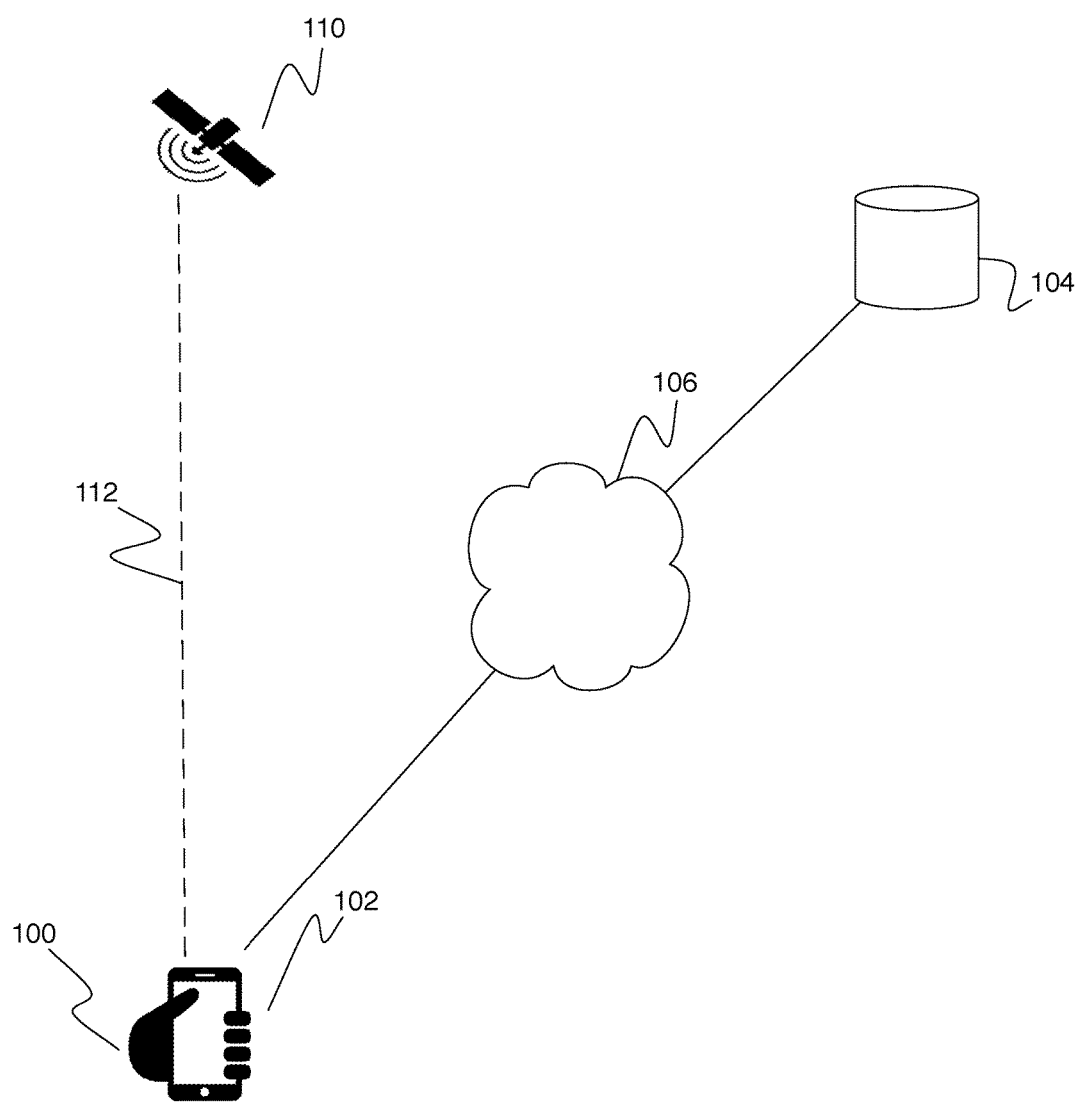
FIG. 1 is a network diagram of a location-based information service application.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Mobile devices, such as smart phones, tablets or any handheld GPS device with network connectivity (e.g., interne connectivity), are now equipped with location detection (herein generically referred to as a "mobile device"). This capability enables applications that offer information based on the location.

Referring to FIG. 1, one or more user 100 uses a mobile device 102 to communicate with one or more servers 104 over a network 106 (e.g., the Internet). A satellite 110 signal 112 provides geo-location coordinates to the mobile device. The user may be moving at various speeds depending if the user is walking, driving, riding a bus etc.

The server(s) maintain information pertaining to geographical elements with fixed GPS coordinates. The information can include explanations for the origin of the geographical elements such as, for example, street names, park names, historical building, surrounding communities and related cultural information. The information can be designed for educational, informational, touristic or advertising purpose.

The information is grouped into categories. The grouping can be hierarchical. Generically, any geographical element with fixed GPS coordinate can be categories and an explanation can be coupled with it. The information related to a geographical element is typically stored in one or more audio file, recorded in one or more language. For one geographical element, the system may store audio file of different size (e.g. comprising more or less details). The user can change the settings of the application to select the categories of interest, the language, the size of the audio information to play.

The user can also select the dimension of the radius within which it would like to receive information. For example, the user can set to receive audio information for all geographical elements within 100 meters of the user location.

The radius can optionally be set based on the speed of motion, such that if the user is moving in a car, the radius is larger than if the user is walking.

The application on the device may optionally display a map of the surroundings as well known in the art. The map may identify (using for example a red dot icon), geographical elements for which the system can provide information. Optionally, the icon displayed on the map may be modified with the information is played on the device (e.g., the red dot turns into a green dot).

For example, a user may select to hear "short" explanations about "street names" within 200 meters radius, in French. As the user changes location the application plays back information on the surrounding street names that are programmed in the server.

Figure 2:
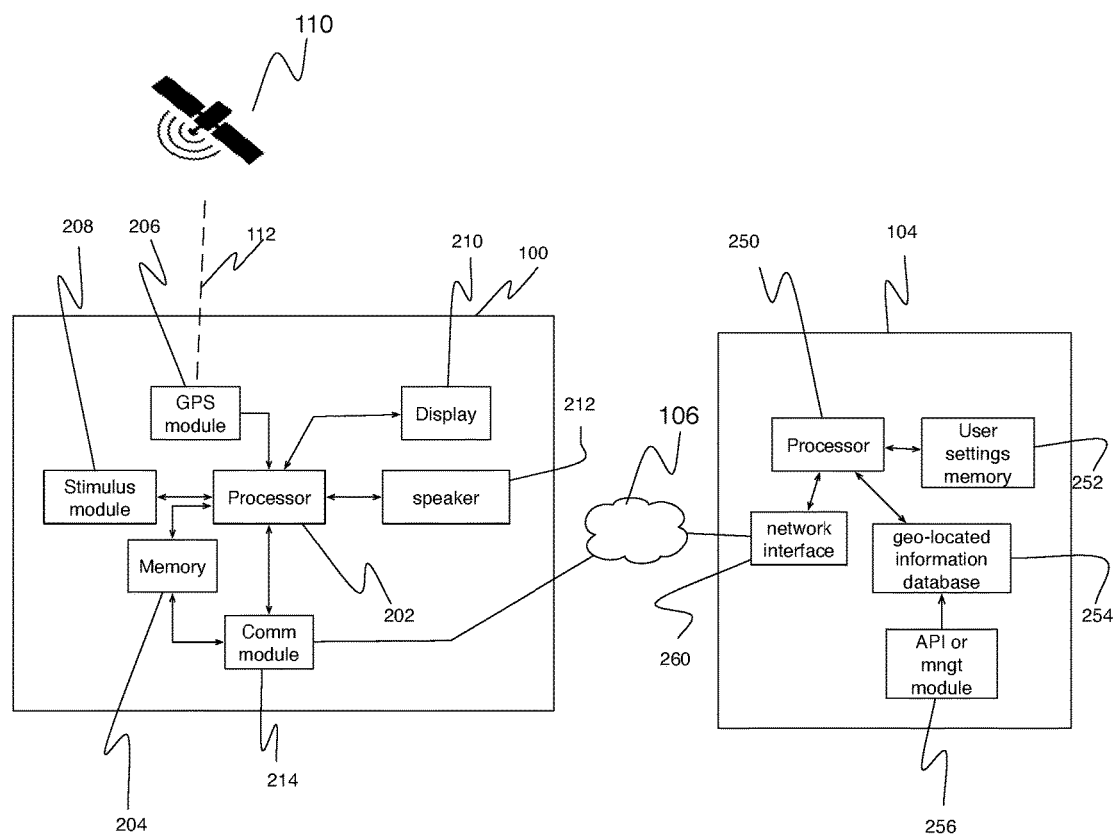
FIG. 2 shows an example architecture of a location-based information service application.

With reference to FIG. 2, the mobile device 100 generally comprises one or more processor 202 that executes software such as a location-based information application. The processor is coupled with a GPS module 206 to receive the satellite 110 signal 112, a stimulus module 208 to detect a stimulus provided by the user (e.g., click, touch, shake, sound), a speaker 212 to output audio, a memory 204 to store data and temporarily store audio files and a communication module 214 used to interface with a network 106 such as the Internet. The communication module may use WIFI or any known wireless communication technologies.

The application server 104 comprises one or more processors 250 coupled with one or more memories to store the user settings 252 for the application (e.g., radius, language etc.) and a database 254 maintaining one or more audio files for geographical elements along with their geo-location. An Application Programming Interface (API) and/or a management module 256 can be used to configure the database 254.

Figure 3:
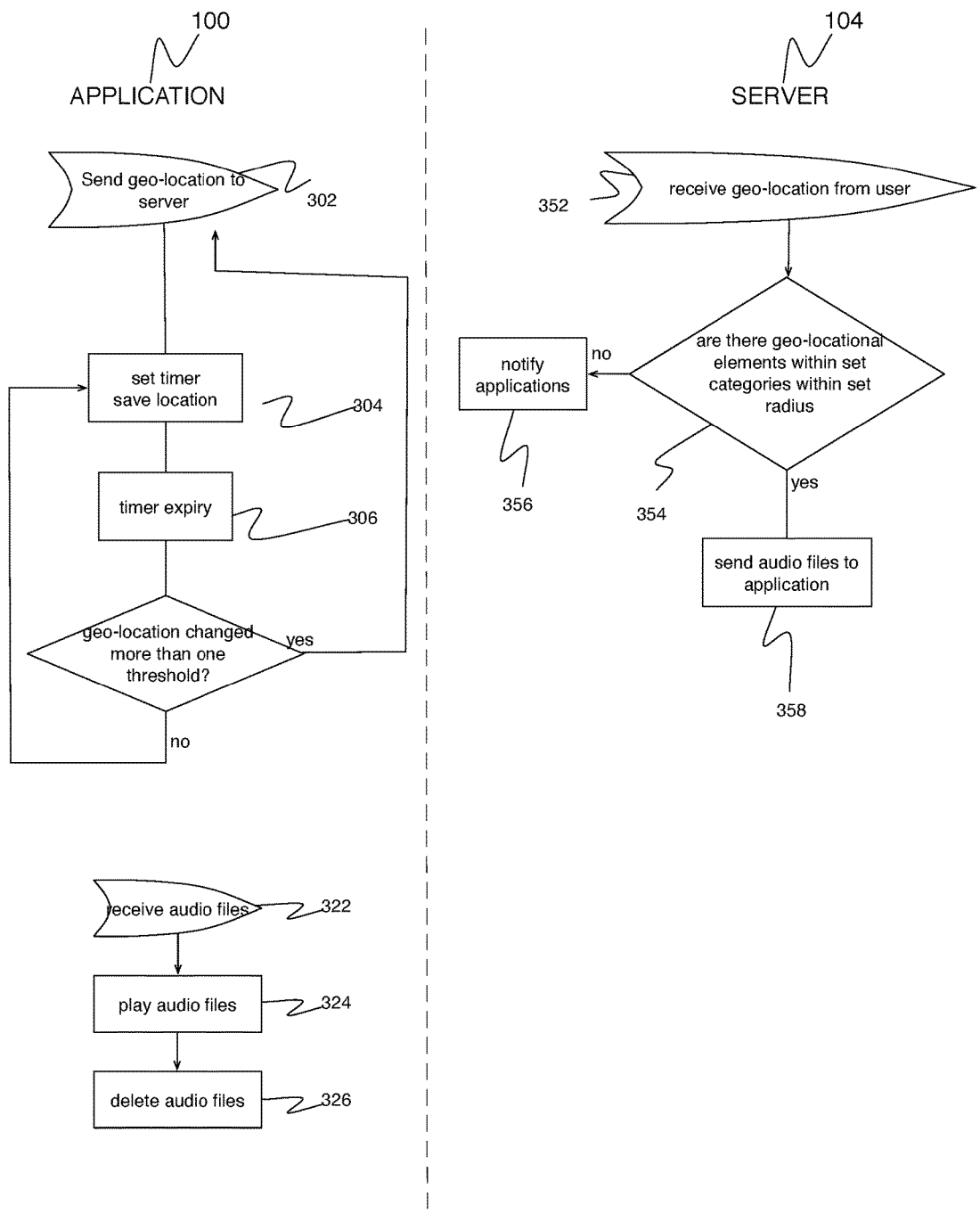
FIG. 3 is a flow chart of an example embodiment for the location based information service application that pushes geo-location to a server.

Referring to FIG. 3, in one embodiment, the mobile device executes an application, which periodically sends its geo-location coordinates 302 to a server 104.

The server receives the geo-location coordinates 352 and searches the database for geographical elements in the set categories that are within the set radius 354. If nothing is found, the server notifies the application 354. The application sets a timer 304 and saves the location into a previous location variable. When the timer expires 306, the current geographical location is compared with the previous location. If the difference is greater than a predetermined threshold (e.g., the user location is substantially different than the previous location), the application sends the coordinates to the server 302. Otherwise the timer is set again 304 and the current location is set to previous location.

If there are geographical elements in the set categories that are within the set radius, one or more audio files corresponding to the elements are downloaded to the mobile device 358. The audio files are of the size set by the user. When the audio files are received by the application 322, they are saved on the device and played back to the user via the mobile device speaker 324. After a predetermined time, the audio files are removed from the mobile device 326.

The timer may be set by the user in the user settings and may optionally vary based on the speed of motion, such that if the user is moving in a car, the radius is larger than if the user is walking. The predetermined time until which the audio files are removed from the mobile device may also be a user setting.

Figure 4:
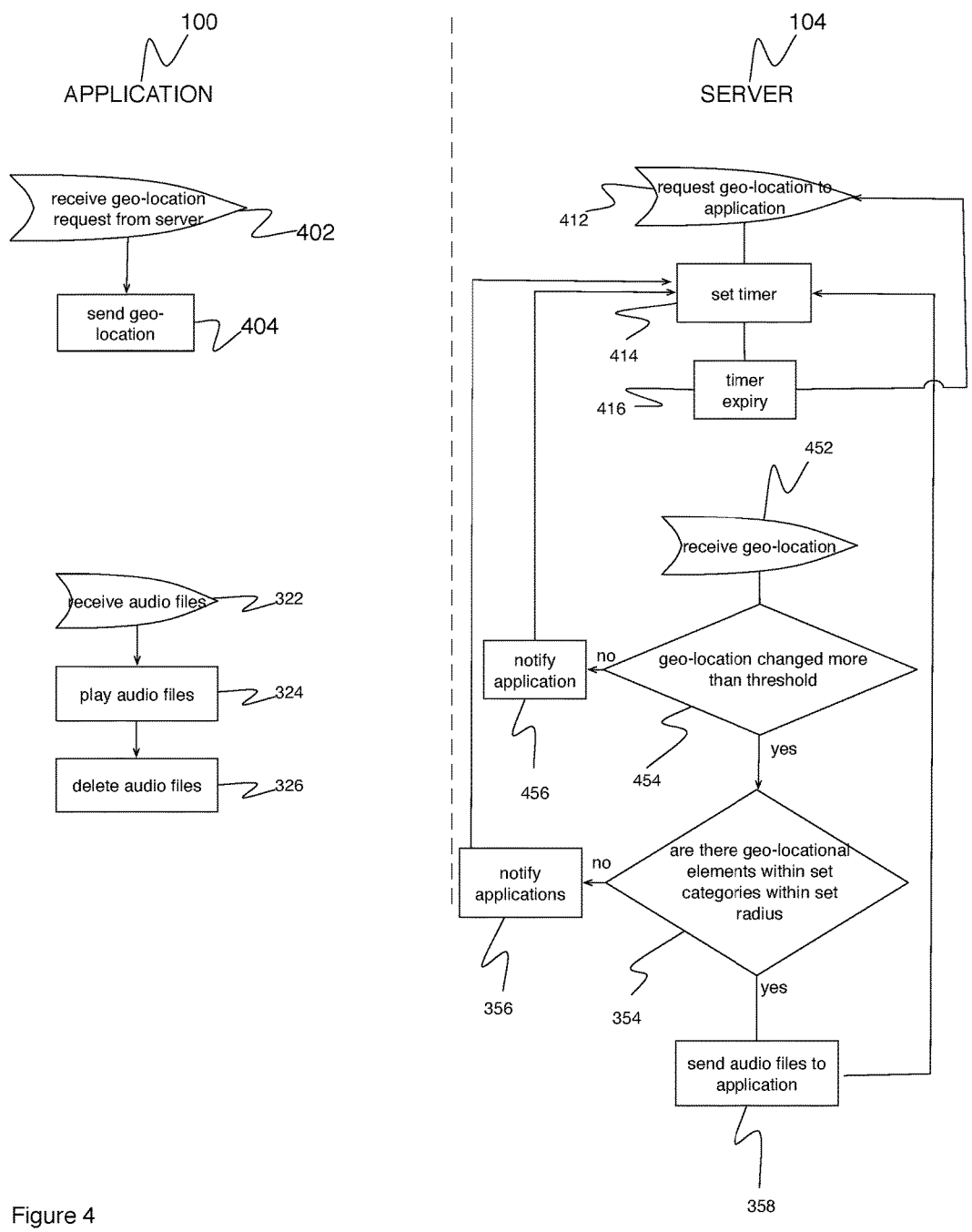
FIG. 4 is a flow chart of an example embodiment for the location based information service application that is polled by a server for its geo-location.

Referring to FIG. 4, in another embodiment, the mobile device executes an application 100, which is enabled to receive requests 412 by a server 104 to send its geo-location coordinates 404.

The server 104 periodically polls each mobile device running the application for the geo-location coordinates 412. Upon receiving the current location for one user 452, the server compares the current location of the user with the previous location received for that user 454. If the difference is lower than a pre-determined threshold (e.g., the user location is not substantially different than the previous location), then the application is notified that nothing needs to be played 456 and a timer is set 414. If the location has changed substantially 454, the server searches the database for geographical elements in the set categories that are within the set radius 354. If nothing is found, the server notifies the application 354 and a timer is set 414.

If there are geographical elements in the set categories that are within the set radius, one or more audio files corresponding to the elements are downloaded to the mobile device 358. The audio files are of the size set by the user. When the audio files are received by the application 322, they are saved on the device and played back to the user via the mobile device speaker 324. After a predetermined time, the audio files are removed from the mobile device 326. The poll timer is set at the server 414 before polling the device again for the current geo-location.

When the poll timer expires 416, the server polls for the current geo-location of the mobile device 412.

In this embodiment, the poll timer may be set by the user in the user settings and may optionally vary based on the speed of motion, such that if the user is moving in a car, the radius is larger than if the user is walking. The predetermined time until which the audio files are removed from the mobile device may also be a user setting.

Figure 5:
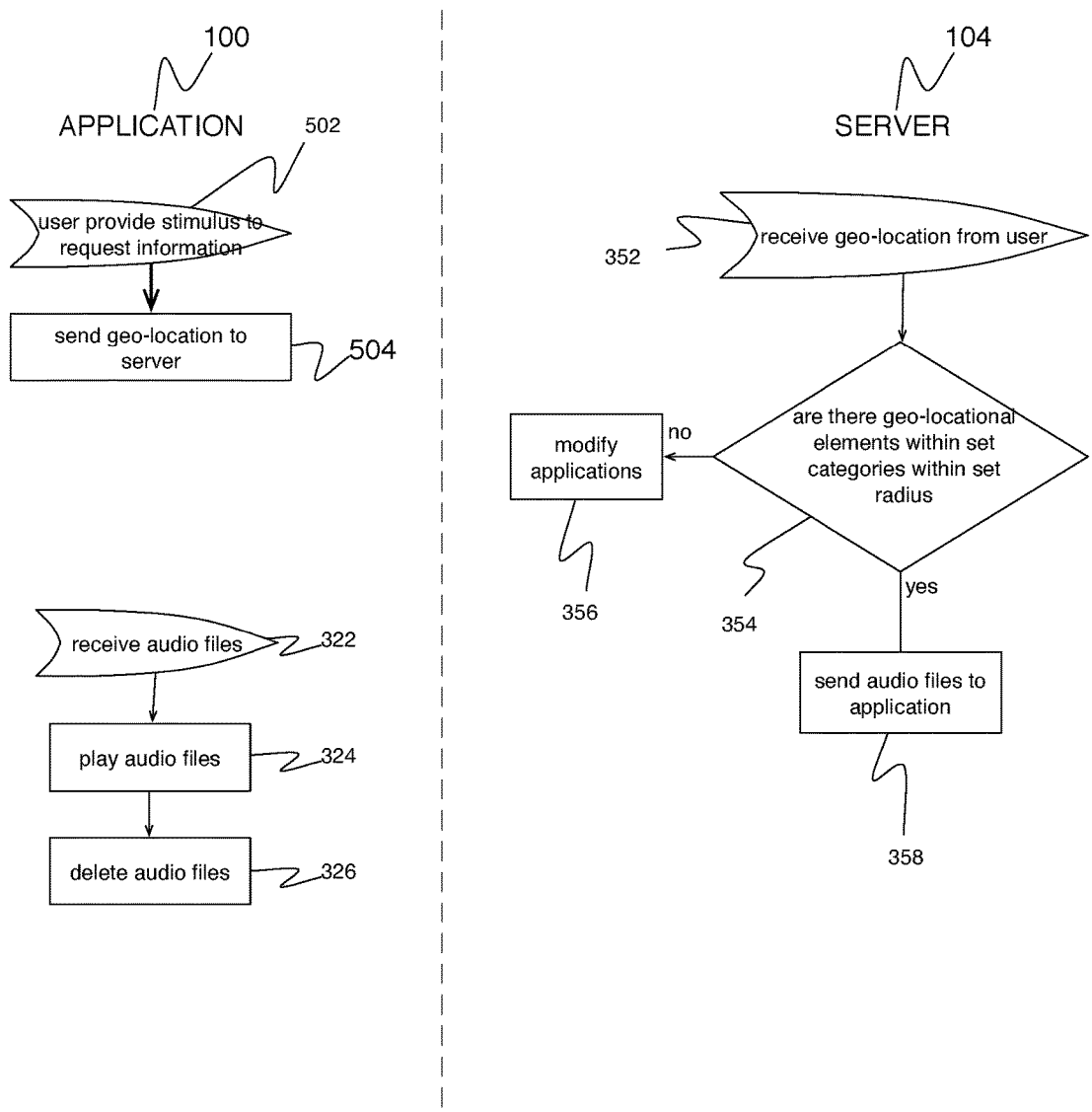
FIG. 5 is a flow chart of an example embodiment for the location based information service application that sends its geo-location to a server based on a stimulus provided by the user.

Referring to FIG. 5, in another embodiment, the mobile device executes an application 100, which send its geo-location coordinates 504 to the application server 104 upon a stimulus 502 generated by the user on the device. The stimulus can be, for example, a click of a button, a touch on the screen, a gesture with the device, a voice command.

The server 104 receives the geo-location coordinates 352 and searches the database for geographical elements in the set categories that are within the set radius 354. If nothing is found, the server notifies the application 354.

If there are geographical elements in the set categories that are within the set radius, one or more audio files corresponding to the elements are downloaded to the mobile device 358. The audio files are of the size set by the user. When the audio files are received by the application 322, they are saved on the device and played back to the user via the mobile device microphone 324. After a predetermined time, the audio files are removed from the mobile device 326.

As another embodiment, the server can correlate the sequence of GPS-locations sent by one application to determine in which direction the user is moving. In this case, the audio can be augmented by adding information that the geographical element being explained is located to the right or left of the user.

In another embodiment, the poll timer may be replaced or combined with a measure of change in geo-location. For example, in the embodiment shown in FIG. 4, the application monitors its change in geo-location and sends new geo-location data to the server only when the change is greater than a pre-determined threshold. As another embodiment, the pre-determined threshold may vary depending on the speed of change in the geo-location.

In another embodiment, the geographical elements maintained by the server may not have fixed GPS coordinates. The coordinates of the geographical elements may be updated periodically.

The database of the geographical elements can be maintained via an application programming interface or programmed directly via a management interface. For example the cultural department of a city may maintain a server with explanations of different geographical elements. Alternatively, the city may subscribe to a service and provide update information which is then input by the service into the server.

In another embodiment, the explanations of the geographical elements are crowd-sourced (e.g., filled by the users—like Wikipedia). The crowd-sourced information is approved by a server manager.

Optionally, the geographical elements are prioritized such that if there is too much audio information to play at one location or the user is moving too fast, only the high priority geographical elements are played back. As another embodiment, the explanations are played randomly. As another embodiment, the application maintains a circular list of which geographical elements have been played back previously in that location and plays back the oldest explanation next.

As another embodiment, the application may be executed in an offline mode, wherein the user is looking at a selected map on the screen and providing stimulus to get information on a location that is not the geo-location or near the geo-location of the device. In this case, the GPS coordinate corresponding to the stimulus provided on the selected map are sent to the server 104. If there are geographical elements with information in the selected category, then the audio file(s) are sent to the device.

Optionally, a user can play back at a later time the information that was previously played, because it was missed or forgotten. A list of previously played locations is provided to the user to select the information that the user wants to play back.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method comprising: receiving, at a server, geo-location coordinates of a location on a selected map on a screen of a mobile device upon generation of a stimulus associated with the map; selecting a radius surrounding the geo-location coordinates of the location; identifying a geographic element within the radius surrounding the geo-location coordinates of the location, the geographic element meeting a predetermined criterion with respect to the geo-location coordinates; selecting an electronic file comprising information on the identified geographical element, transmitting the selected electronic file to the mobile device; wherein the stimulus is provided for obtaining information on the location on the selected map and the geo-location coordinates of the location on the map are independent of the geo-location coordinates of the mobile device.

2. The method according to claim 1, further comprising receiving the predetermined criterion from the mobile device, the predetermined criterion established by a user of the mobile device.

3. The method according to claim 1, further comprising receiving from the mobile device, data relating to the selection of the electronic files, wherein the data relates to at least one of a size, content, and language of the electronic files.

4. The method according to claim 1, wherein the electronic files are provided by at least one of a city council, a tourism department, an educational department, an advertising group, a retailer, and crowd sourcing.

5. The method according to claim 1, wherein the electronic file is one of an audio file, an image file, a video file and any combination thereof.

6. The method according to claim 1, wherein the stimulus comprises a click of a button on a keypad of the mobile device, a touch on a touchscreen of the mobile device, a gesture on the touchscreen of the mobile device, a gesture captured with a camera forming part of the mobile device, or a vocal input provided to the mobile device by a user of the mobile device.

7. The method according to claim 1, wherein the electronic files are provided by at least one of a city council, a tourism department, an educational department, an advertising group, a retailer, and crowd-sourcing.

8. A method comprising: transmitting via a communications network geo-location coordinates of a location on a selected map on a screen of a mobile device to a remote server upon generation of a stimulus associated with the map; receiving from the remote server an electronic file associated with a geographic element, the geographic element meeting a predetermined criterion with respect to the geo-location coordinates of the location and identified within a selected radius surrounding the geo-location coordinates of the location; and at least one of: storing the electronic file within a memory of the mobile device; and executing the electronic file on the mobile device; wherein the stimulus is provided for obtaining information on the location on the selected map and the geo-location coordinates of the location on the map are independent of the geo-location coordinates of the mobile device.

9. The method according to claim 8, further comprising removing the electronic files from the memory of the mobile device.

10. The method according to claim 9, wherein the removal is determined by a timer.

11. The method according to claim 8 further comprising establishing the predetermined criterion on the mobile device; and transmitting the predetermined criterion from the mobile device to the remote server.

12. The method according to claim 8, wherein the electronic file is one of an audio file, an image file, a video file and any combination thereof.

13. The method according to claim 8, wherein the stimulus comprises a click of a button on a keypad of the mobile device, a touch on a touchscreen of the mobile device, a gesture on the touchscreen of the mobile device, a gesture captured with a camera forming part of the mobile device, or a vocal input provided to the mobile device by a user of the mobile device.

14. A system comprising: a server coupled to a communications network and comprising at least a microprocessor and a non-transitory computer readable medium; wherein when the microprocessor executes computer-executable instructions stored upon the non-transitory computer-readable medium, said instructions cause the system to: receive geo-location coordinates of a location on a selected map on a screen of a mobile device upon generation of a stimulus associated with the map; selecting a radius surrounding the geo-location coordinates of the location; identify a geographic element within the radius surrounding the geo-location coordinates of the location, the geographic element meeting a predetermined criterion with respect to the geo-location coordinates; select an electronic file comprising information on the geographical element; and transmit the selected electronic file to the mobile device; wherein the stimulus is provided for obtaining information on the location on the selected map and the geo-location coordinates of the location on the map are independent of the geo-location coordinates of the mobile device.

15. The system according to claim 14, further comprising additional computer-executable instructions which when executed cause the system to: receive the predetermined criterion from the mobile device, the predetermined criterion established by a user of the mobile device, or receive from the mobile device data relating to the selection of the electronic files, wherein the data relates to at least one of a size, content, and language of the electronic files.

16. The system according to claim 14, wherein the geo-location coordinates identify the geographic element as being oriented to the left or right with respect to the location on the map.

17. The system according to claim 14, wherein the electronic file is one of an audio file, an image file, a video file and any combination thereof.

18. The system according to claim 14, wherein the stimulus comprises a click of a button on a keypad of the mobile device, a touch on a touchscreen of the mobile device, a gesture on the touchscreen of the mobile device, a gesture captured with a camera forming part of the mobile device, or a vocal input provided to the mobile device by a user of the mobile device.

* * * * *